Sept. 28, 1965 R. E. SILVERA 3,208,185
DEVICE FOR SIMULATING SPACE VEHICLE FLIGHT
TRAJECTORY OF AN EARTH SATELLITE
Filed July 19, 1962
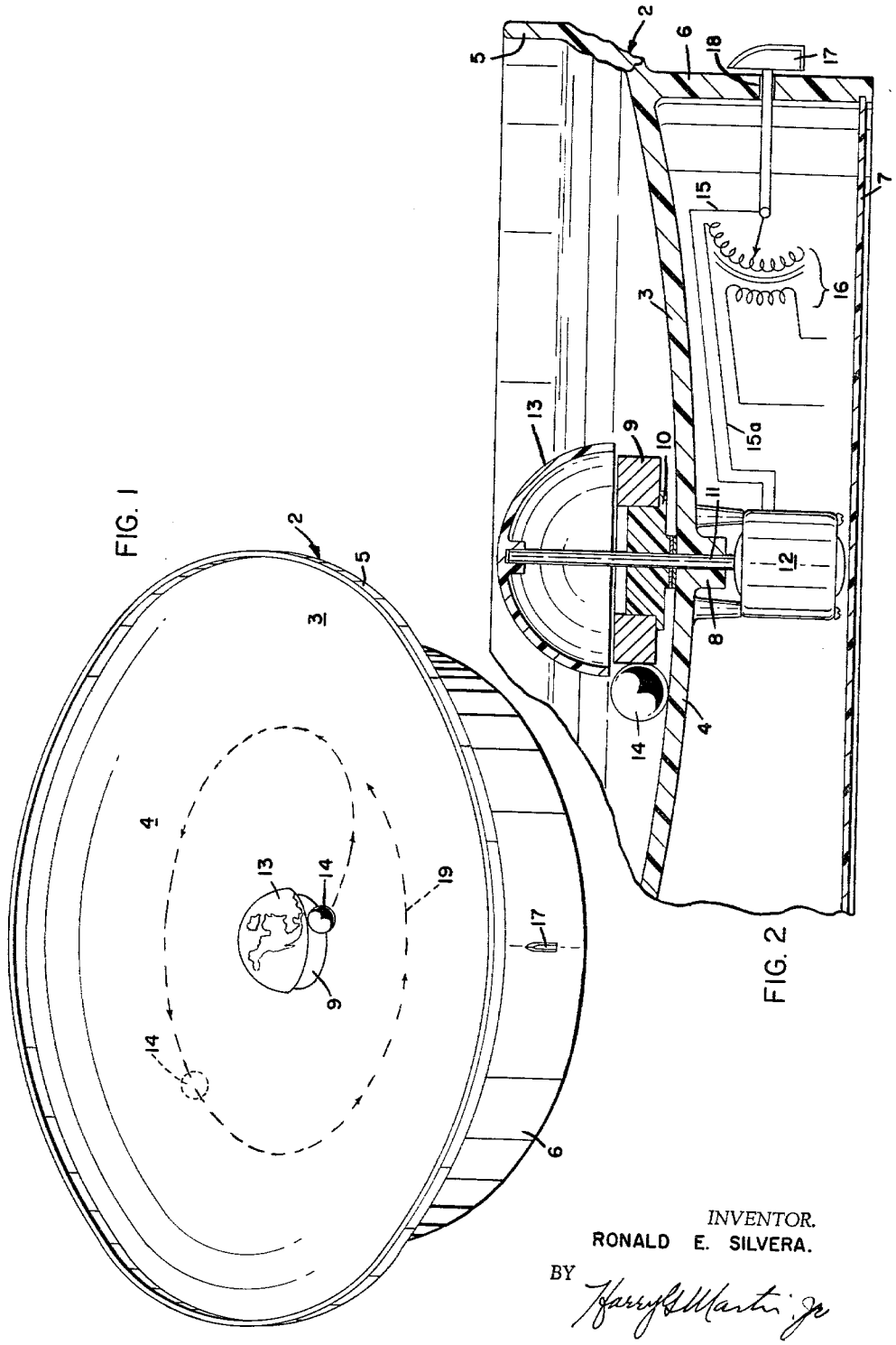
INVENTOR.
RONALD E. SILVERA.
BY
ATTORNEY.

United States Patent Office 3,208,185
Patented Sept. 28, 1965

3,208,185
DEVICE FOR SIMULATING SPACE VEHICLE FLIGHT TRAJECTORY OF AN EARTH SATELLITE
Ronald E. Silvera, Wayne Ave., Stony Point, N.Y.
Filed July 19, 1962, Ser. No. 210,933
7 Claims. (Cl. 46—241)

This invention relates to a device for simulating the flight trajectory of a space vehicle about a planet such as the earth and, more particularly, to such a device which is both entertaining and educational for use as a toy or as an educational device for illustrating trajectories of space vehicles.

The chief object of the invention is to provide a device for simulating a space vehicle flight trajectory of an earth satellite.

An object of the invention is to provide a toy or educational device for simulating artificial satellite travel about the earth.

A further object is to provide a toy or educational device in which spinning forces and centrifugal reaction are imparted to a simulated space vehicle to hurl it into trajectory about a simulated planet, the spinning forces imparting such motion to the simulated planet for at least a number of revolutions. Other objects of the invention will be readily perceived from the following description.

This invention relates to a device for simulating a space vehicle flight trajectory of an earth satellite which comprises in combination a platform to simulate space, a member to simulate a space vehicle, and means to impart centrifugal reaction to said member sufficient to disengage the member from said means and to place the member in trajectory on said platform about said means.

This invention further relates to a method for simulating the space vehicle flight trajectory of an earth satellite which consists in the steps of utilizing a circular magnet to impart spinning forces to a ball-like member, and increasing the speed of the magnet to create centrifugal reaction sufficient to free the member therefrom and to hurl the member into a trajectory thereabout.

The attached drawing illustrates a preferred embodiment of the invention, in which:

FIGURE 1 is a perspective view of the device of my invention; and

FIGURE 2 is a view partly in section and partly diagrammatic of the device shown in FIGURE 1.

Referring to the attached drawing, there is shown a device 2 for simulating a space vehicle flight trajectory of an earth satellite. The device includes a circular platform 3 having a concave bottom 4 and terminating in a vertical wall or flange member 5. The platform 3 is formed of non-magnetic material and preferably of suitable plastics such as styrene copolymer, vinyl chloride, vinyl acetate and the like. Platform 4 represents space in the device and preferably, is ornamented or decorated in suitable colors for the purpose.

Platform 3 is provided with a skirt or apron 6 which serves as a suitable support, the skirt or apron 6 being closed by a base 7. If desired, separate supports may be employed instead of the skirt 6 and base 7 illustrated. The platform 3 is provided with a hub 8, as hereinafter explained.

A circular permanent magnet 9 is placed substantially centrally of platform 3 and is mounted upon and keyed to a support plate 10 of non-magnetic material mounted upon platform 3. The shaft 11 of a variable speed motor 12 extends through hub 8 and through plate 10 and is secured thereto so that plate 10 and magnet 9 rotate with the motor 12.

An arcuate member 13 designed to simulate the earth or another planet is mounted upon shaft 11 above magnet 9 and is adapted to rotate therewith. It will be appreciated, of course, member 13 need not be mounted to rotate with shaft 11 and magnet 9 but may remain stationary during operation of the device if desired.

A steel ball 14 is provided designed to simulate a space vehicle during operation of the device. When the device is at rest, ball 14 is attracted by magnet 9. Preferably, ball 14 has a diameter of 1¼–1½ inches for best performance and is not less than perhaps ¾ of an inch in diameter.

Motor 12 is connected by lines 15, 15a to a transformer 16 to a suitable source of current such as house current. Indicator 17 extending through an opening 18 in skirt 6 varies the current supply through transformer 16.

It will be understood the present device is designed to simulate forces exerted upon a space vehicle when it is in orbit. For example, gravitational pull of the earth is simulated by magnet 9 while drag or the forces of friction exerted upon a vehicle going into orbit is simulated by the friction provided by platform 3. Turning of the magnet creates centrifugal reaction upon the steel ball which permits it to break away from the pull of the magnet which in turn represents the gravity pull of the earth.

Considering operation of the device, motor 12 is actuated which rotates magnet 9 in a clockwise direction. Since ball 14 is attracted to and resting against the magnet, such rotation gives velocity and a spinning motion in a counterclockwise direction to the ball. As the speed of rotation of the magnet is increased, the ball accelerates in the rotational movements and centrifugal reaction is established which hurls the ball from the magnet into a trajectory around the member 13, the trajectory being designated by dotted line 19 in FIGURE 1. The spinning motion of the steel ball, besides its velocity, tends to keep the ball rotating around the platform and circular member 13 as though in orbit.

Using a circular magnet and steel ball provides the steel ball momentum and thereafter sufficient velocity and spinning effect to the point where it disengages from the magnet and shoots out into the platform by centrifugal reaction. It makes a number of rotations around the platform after its disengagement from the magnet because of the induced spinning caused upon the ball by the magnet during rotation.

It will be appreciated during rotation and spinning of the ball by the magnet the axis of the ball is in a vertical direction. Occasionally, when the ball is rotating around the platform, it may turn in position with the axis of the ball in a horizontal direction to the platform so that the ball will accelerate and "shoot out" to the outer edge of the platform simulating an object failing to stay in orbit around the earth and escaping into space to orbit around the Sun. It will be understood flange 5 of platform 3 prevents the ball from being hurled from the platform.

While I have described the motive forces for the magnet as a variably speed motor, it will be appreciated a standard electric motor may be employed or if desired the magnet may be actuated manually with any suitable geared mechanism for high speed.

The present device provides a simple and inexpensive device for placing a simulated space vehicle in orbit and for simulating its trajectory about the earth. The device may be employed as a toy or game or may be used as an educational device to illustrate the manner in which a space vehicle may be placed in orbit and its rotation or rotations about the earth.

While I have described a preferred embodiment of the

I claim:

1. In a device for simulating a space vehicle flight trajectory of an earth satellite, the combination of a non-magnetic platform to simulate space, a member to simulate a planet from which the space vehicle is to be launched, a second paramagnetic member simulating the space vehicle, a circular magnet adjacent the first member and in engagement with the second member, and means for rotating the magnet to impart centrifugal reaction to the second member sufficient to disengage the second member from the magnet and to place the second member in trajectory on said platform about the first member.

2. A device according to claim 1 in which the rotating means comprise a variable speed motor and a transformer to actuate the motor.

3. In a device for simulating a space vehicle flight trajectory of an earth satellite, the combination of a non-magnetic platform to simulate space, a paramagnetic member to simulate a space vehicle, a circular permanent magnet in a position to influence movement of said member, and means to rotate said magnet to impart centrifugal reaction to said member thereby placing the member in free trajectory on said platform about said magnet.

4. In a device for simulating a space vehicle flight of an earth satellite, the combination of a non-magnetic platform to simulate space, a support to retain the platform in substantially horizontal position, a paramagnetic ball member to simulate a space vehicle, an arcuate member to simulate a planet from which the space vehicle is to be launched, a circular permanent magnet adjacent the arcuate member and placed substantially centrally of the platform, said ball member being attracted by the magnetic forces of said magnet and being in contact therewith, means for supporting the magnet in desired position, and a variable speed motor for rotating the magnet to impart centrifugal reaction to said ball member sufficient to hurl the ball member in trajectory on said platform about said arcuate member.

5. In a method for simulating the space vehicle flight trajectory of an earth satellite, the steps which consist in utilizing a circular magnet to impart spinning forces about a vertical axis to a paramagnetic ball-like member, and increasing the speed of the magnet to create centrifugal reaction sufficient to free the member therefrom and to hurl the member into a free trajectory thereabout.

6. In a device for simulating a space vehicle flight trajectory of an earth satellite, the combination of a non-magnetic platform to simulate space, a paramagnetic ball member to simulate a space vehicle, a circular magnet in a position to influence movement of said member, and means for rotating said magnet thereby spinning said member about a vertical axis and establishing centrifugal reaction so that said member escapes the pull of the magnet and slides over said platform to be placed in trajectory.

7. In a method for simulating the space vehicle flight trajectory of an earth satellite, the steps which consist in rotating a circular magnet around a vertical axis to impart spinning forces to a paramagnetic ball member influenced thereby and placed on a non-magnetic platform, and establishing centrifugal reaction between the magnet and the ball spinning in a vertical axis sufficiently to permit the ball to escape the pull of the magnet and be placed in trajectory thereabout on the non-magnetic platform.

References Cited by the Examiner

UNITED STATES PATENTS

| | | | |
|---|---|---|---|
| 2,188,619 | 1/40 | Bernhardt | 273—86.2 |
| 2,248,596 | 7/41 | Wilsey | 124—41 |
| 2,811,362 | 10/57 | Bariether | 273—142 |
| 2,870,550 | 1/59 | Decker | 35—46 |
| 2,896,368 | 7/59 | Higley | 46—74 |
| 2,949,682 | 8/60 | Humbert | 273—142 |

RICHARD C. PINKHAM, *Primary Examiner.*